May 1, 1934.   B. J. PEPPER   1,957,412
INDICATING AND METERING APPARATUS FOR LIQUID DISPENSERS
Filed Nov. 2, 1933   4 Sheets-Sheet 2
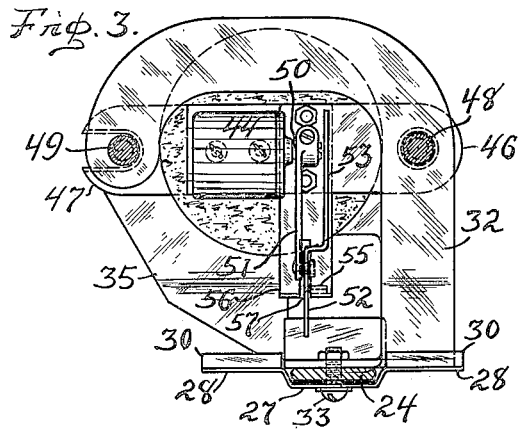
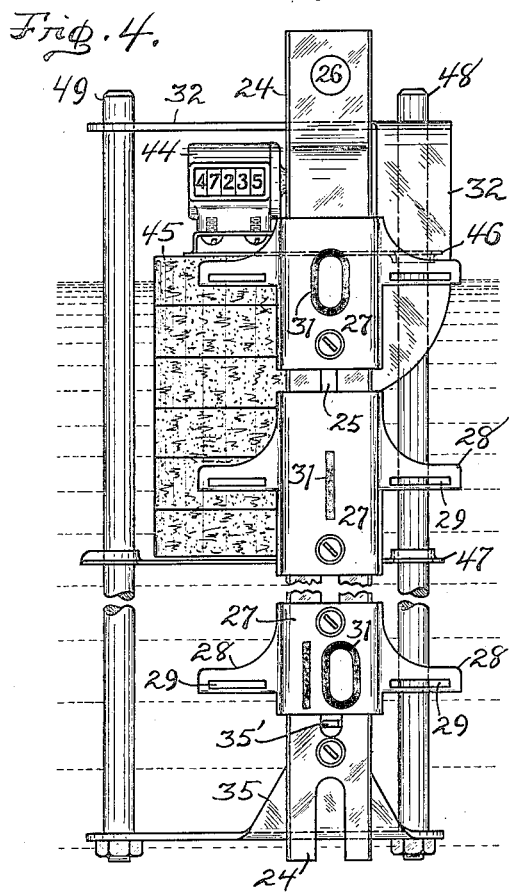
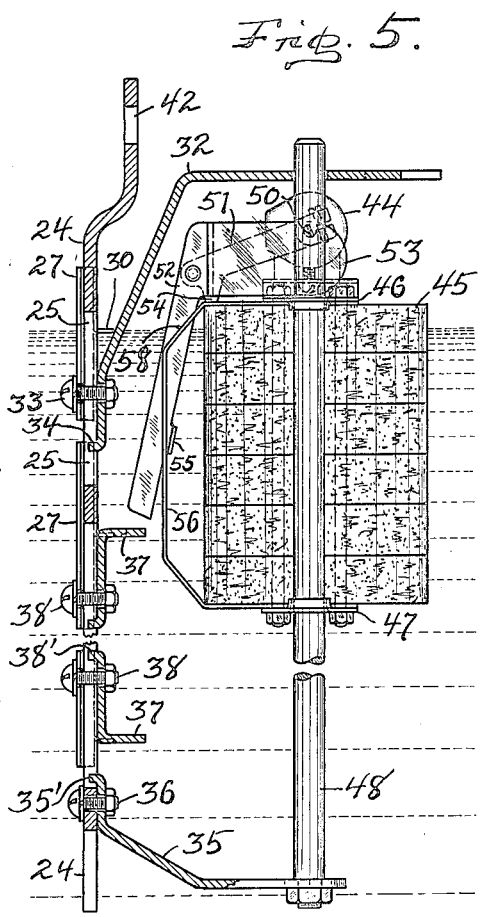
Byron J. Pepper INVENTOR.
BY
H. G. Burns ATTORNEY.

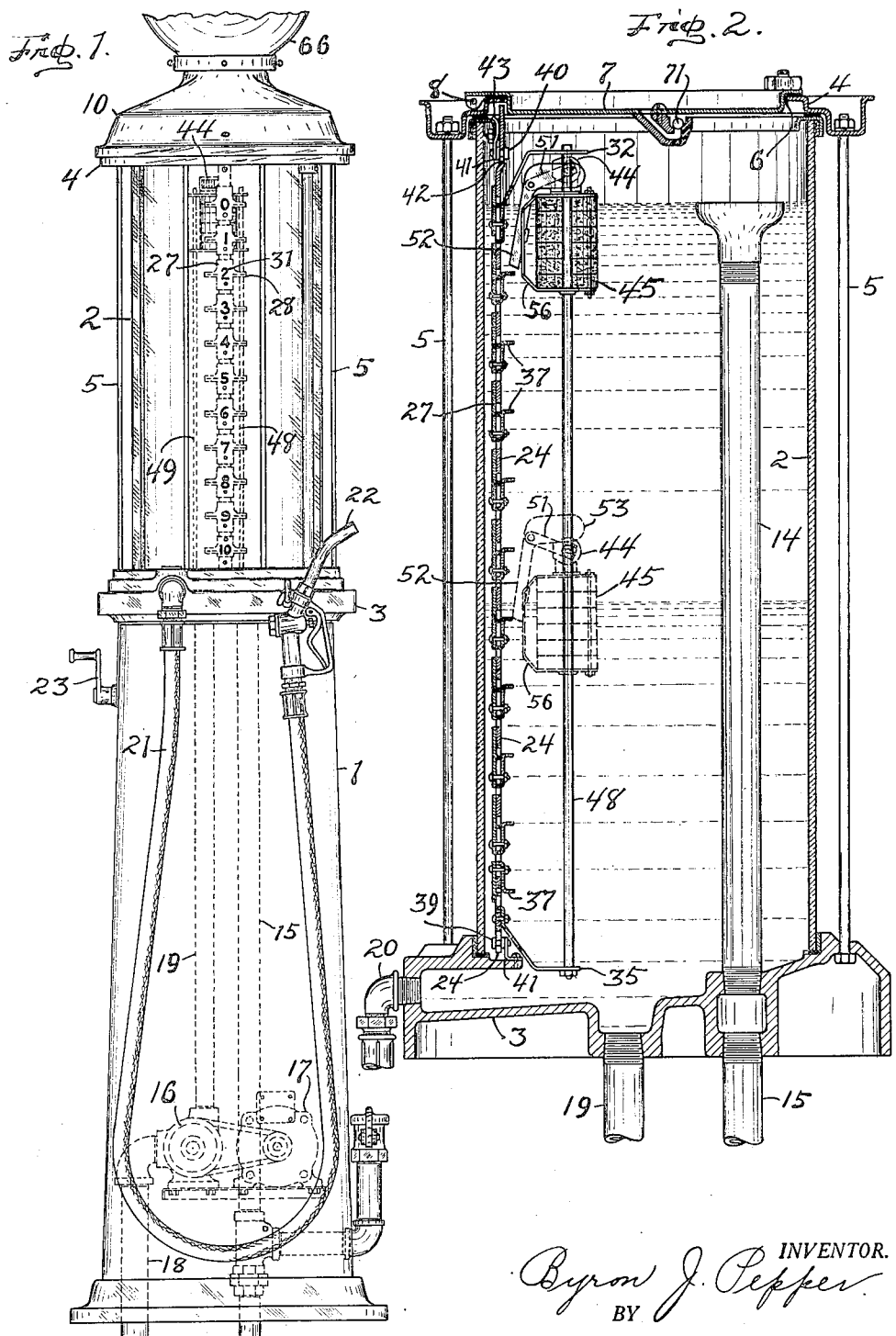

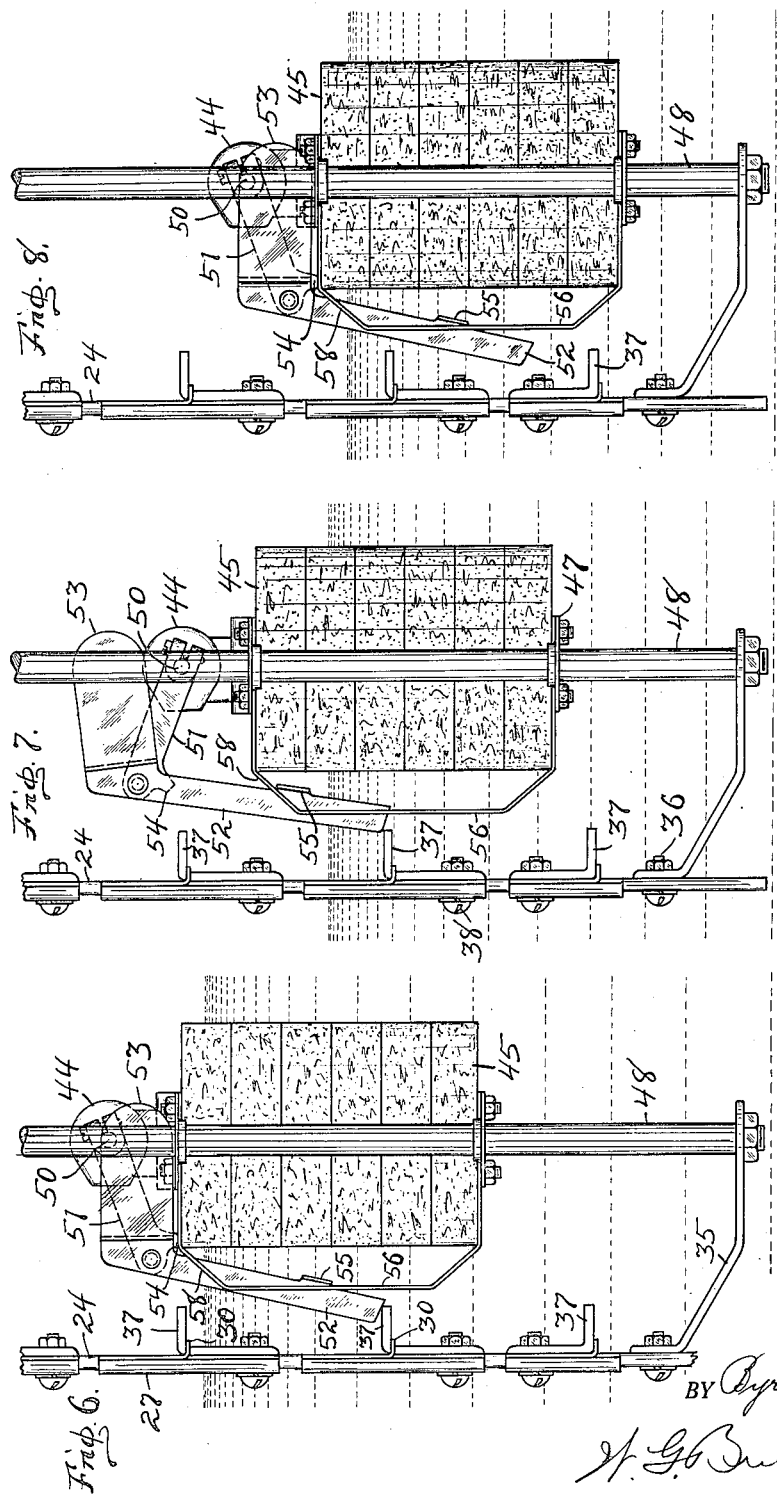

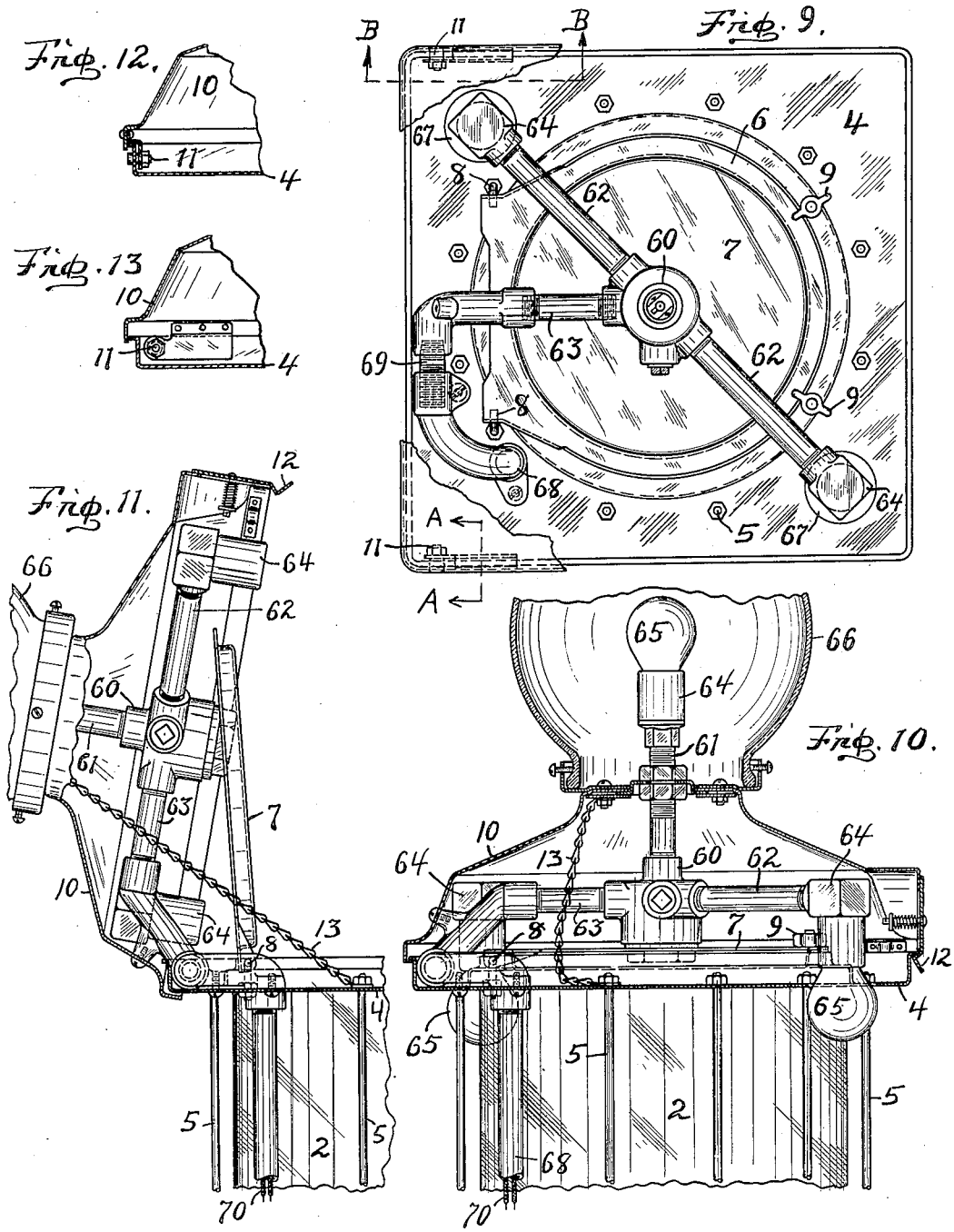

Patented May 1, 1934

1,957,412

UNITED STATES PATENT OFFICE 1,957,412

INDICATING AND METERING APPARATUS FOR LIQUID DISPENSERS

Byron J. Pepper, Fort Wayne, Ind., assignor to Tokheim Oil Tank and Pump Company, Fort Wayne, Ind., a corporation of Indiana Application November 2, 1933, Serial No. 696,365

7 Claims. (Cl. 221—100)

This invention relates to improvements in indicating and metering apparatus for liquid dispensers, such for example, the visible type used in gasoline filling stations.

One of the objects of the invention is to provide in connection with a liquid dispenser of the visible type, in which liquid is drawn from a suitable source of supply and displayed in a glass measuring vessel preparatory to delivery of the liquid to the customer through a discharge hose, a simple mechanism for indicating the liquid content of the measure and for metering the liquid as it is withdrawn therefrom.

Another object is to construct the indicating and metering apparatus and apply it to the measure of the dispenser so as to be readily removable from the measure bodily and replaceable without requiring readjustment, to thereby facilitate cleaning the indicating mechanism and the interior of the measure.

Other objects and advantages of the invention will appear in the following description.

An illustrative embodiment of the invention is shown in the accompanying drawings, in which:—

Fig. 1 is a front elevation of a dispenser equipped with the invention;

Fig. 2 is a vertical section of a measuring vessel with the indicating and metering device installed therein;

Fig. 3 is a top plan view of the indicating and metering apparatus, parts being in section;

Fig. 4 is an elevation projected from Fig. 3, a portion thereof being broken away;

Fig. 5 is an elevation projected from Fig. 4 in a plane at right angles thereto, parts being in section;

Figs. 6, 7 and 8 are side elevations of the indicating and metering apparatus showing the metering device in successive positions assumed during operation thereof;

Fig. 9 is a top plan view of the dispenser with the dome thereof cut away;

Fig. 10 is a fragmentary elevation projected from Fig. 9 partially in section;

Fig. 11 is a fragmentary elevation of the structure shown in Fig. 10 with the dome and lid for the measure in open position, parts being in section;

Fig. 12 is a detail section on the line A—A of Fig. 9; and

Fig. 13 is a detail section on the line B—B of Fig. 9.

The invention is comprised of a liquid dispenser of the visible type having a glass measuring vessel for displaying liquid to be delivered; an indicator for showing the amount of liquid dispensed from the measure; a counter for registering the aggregate amount of liquid withdrawn from the measure; and a buoyant support for the counter.

The dispenser

The illustrative embodiment of the invention includes a liquid dispenser having a pedestal 1 surmounted by a glass cylinder constituting a measure 2 the base 3 for which preferably forms also the capital for the pedestal. The top of the cylinder has thereon a head 4 connected to the base by a series of rods 5 whereby the cylinder is held in place. The head 4 has therein an opening 6 that is normally closed by a lid 7 mounted on hinge brackets 8 and which is secured when in closed position by turn-buttons 9.

Upon the head 4 is mounted a dome 10 by means of hinges 11 located at one side of the head, and the dome is provided with a spring-restrained latch 12 that engages the opposite side of the head and secures the dome when in closed position. The dome has swinging movement upon its hinges 11 to an extent limited by a chain 13 that is attached at one end to the dome structure and at its opposite end to the head 4. When the dome 10 and the lid 7 are in open position as shown in Fig. 11 access is had to the interior of the measure 2 through the opening in the head 4.

The measure

The measure 2 has therein an overflow pipe 14 that has communication through the base 3 with a return pipe 15 by which the overplus of liquid supplied to the measure is conveyed to a storage tank (not shown) in the usual manner. Liquid is supplied to the measure by means of a pump 16, provided with actuating means therefor, such as a motor 17, and connected with said storage tank and the measure respectively by suitable suction and supply pipe connections 18 and 19. The measure has also an outlet fixture 20, connected in its base 3, that terminates with a dispensing hose 21 provided with a manually-operated valve-controlled nozzle 22 through which liquid is dispensed from the measure to patrons.

An operating handle 23 conveniently located on the pedestal is suitably connected with the motor circuit by which the motor is controlled. The connections between the operating handle and the motor are not herein illustrated as any ordinary manually operated means may be employed for opening and closing the motor circuit whereby supply of liquid to the dispenser is controlled.

The indicator

To show the amount of liquid content in the measure there is provided an indicator removably disposed within the glass cylinder. The indicator consists of a supporting standard 24 formed of a bar provided with a series of slots 25, and also an opening 26 adjacent its upper end. The standard has adjustably secured thereon a series of gauge members 27, each having lateral wings 28 provided with horizontal slots 29 and corresponding ledges 30 that extend along the lower edges of said wings. The gauge members 27 are disposed on the front face of the standard 24 in successive order, one above the other, and bear respectively individual distinguishing indicia 31 such as 0, 1, 2, 3, etc. in numerical order commencing at the top.

Adjacent the upper end of the standard 24 upon the rear face thereof is secured a bracket 32 by means of a bolt 33 that also conveniently serves to secure the uppermost gauge member 27 in place on the standard. The bracket 32 has at its lower end a guide lug 34 that projects into the corresponding slot 25 in the standard so that tilting of the bracket relative to the standard is prevented. Also, adjacent the lower end of the standard 24 upon the inner face thereof is secured a second bracket 35 by means of a bolt 36. The bracket 35 also is provided with a guide lug 35' that projects into the corresponding slot 25 to prevent tilting thereof with respect to the standard. The brackets are for the purpose hereinafter set forth.

Upon the standard 24 against the inner face thereof are a series of stops 37 secured respectively thereon by means of bolts 38 that also serve as the securing means for the complemental gauge members 27, and each stop projects rearwardly from the standard and is provided with a guide lug 38' that projects into the corresponding slot 25 in the standard so that tilting thereof is prevented. Upon vertical adjustment of the gauge members 27 the corresponding stops attached thereto are likewise adjusted vertically with respect to the standard.

The standard 24 is removably disposed within the measure 2 upon knobs 39 and 40 located respectively in lower and upper portions of the measure upon suitable brackets 41. The lower end of the standard 24 is bifurcated and straddles the knob 39 and the upper end which is provided with an opening 42 is secured upon the knob 40 which extends through said opening when the indicator is in operating position. A retaining spring 43 is provided in the upper end of the measure that bears against the standard when in place on the knob to hold it removably in operating position.

The counter

The mechanism for registering the amount of liquid withdrawn from the measure consists of a counter 44 preferably of the ordinary stem-operated type that is superimposed upon a float 45 that is provided with top and bottom end-plates 46 and 47 respectively. A pair of vertically disposed guide-rods 48 and 49 are mounted in the brackets 32 and 35 and are spaced apart for the accommodation of the float 45 therebetween. The end-plates 46 and 47 have sliding movement upon the rod 48, and one end of the plate 47 is bifurcated and extends astride the guiderod 49, whereby swinging movement of the float upon the axis of the guiderod 48 is circumvented.

The operating stem 50 of the counter 44 has secured thereon an actuating arm 51, the outer end of which has loosely pivoted thereon an engaging member 52 provided with an angular extension constituting a weight 53. The actuating arm 51 has adjacent its outer end a downwardly extending projection constituting a stop 54 which, by having contact with the top of the float structure, limits swinging movement of said arm toward the float.

The engaging member 52 has a laterally extending lug 55 that bears against the inner face of a vertically disposed deflector 56 secured on the float 45 that preferably has a vertical slot 57 through which the engaging member loosely extends, and also has at its upper end an inwardly inclined portion 58 engageable by said lug upon downward movement of the float when the engaging member 52 is detained by one or the other of the stops 37, and which is operable to cause disengagement of said member from the stops engaged thereby sequentially at predetermined points as the float progresses downwardly. Normally, the actuating arm 51 is held in its lowermost position with respect to the float by the weighted engaging member 52, and when the actuating arm is thus positioned the lower end of the engaging member extends into the vertical plane of the stops 37 so as to become engaged by said stops successively and detained thereby during downward movement of the float as the liquid in the measure 2 is withdrawn therefrom. Concurrently with the downward movement of the float, while the engaging member is detained by the stops respectively, movement is imparted to the actuating arm 51 causing the stem 50 of the counter to turn, whereupon said counter is actuated as the level of liquid in the measure falls from any one gauge member to the next succeeding gauge member.

The glass cylinder for the measure 2 is so proportioned and the overflow pipe 14, gauge members 27, and the stops 37 are relatively positioned in the measure respecting each other so that when the measure is filled to its limitation, determined by adjustment of said overflow pipe, its maximum content of liquid is of definite volume defined in equal units of measurement, such for example as gallons. The gauge members are adjusted at suitable points in the measure so as to indicate, by coincidence of the level of the liquid in the measure, the quantity of liquid as it is removed therefrom, and the stops cause operation of the counter severally by detention of the engaging member as the float descends with the liquid level from one indicating stage to the next succeeding stage.

For the purpose of illumination the dome 10 has mounted therein a fixture 60 having conduit branches 61, 62 and 63, the branches 61 and 62 being provided with sockets 64 in which are mounted electric lamps 65. Preferably, the dome 10 has thereon a transparent globe 66 that encompasses the lamp on the branch 61, and the head 4 is provided with openings 67 through which the lamps on the branches 62 and 63 extend respectively when the dome is in closed position. The branch 63 is connected with a stationary conduit 68 in the apparatus by means of a nipple 69 axially alined with the hinges 11 for the dome, so as to permit the lamp-supporting conduit fixture to be moved bodily with the dome, as it is opened and closed, without disconnection of the branch 63 from the stationary conduit 68. The lamps are energized by current supplied by conductors 70 that lead from a suitable source of energy (not shown) and which are strung through the conduit structure to the lamp sockets.

As a means to prevent formation of vacuum in the measure when fall of the liquid level therein takes place, an inlet check-valve 71 is located preferably in the lid 7 through which air is admitted into the measure to compensatingly displace the liquid discharged therefrom.

Operation

In operation, the motor 17 is set in action by turning the operating handle 23 to switch closing position, whereupon the pump 16 is operated and the measure 2 is filled with liquid to the level of the overflow pipe 14. Coincidentally, with the rise of the liquid level in the measure the float 45 is raised so that when the measure is filled to the overflow level, the lower end of the engaging member 52 overhangs the uppermost of the stops 37. Also, when the measure has been filled the liquid level in the measure registers with the slots 29 in the uppermost gauge member 27 which is observable.

The liquid in the measure is dispensed therefrom by opening the nozzle 22 which permits the liquid to gravitate out from the measure through the hose 21. Coincident with the outflow of liquid from the measure the float descends with the fall of the liquid level and incidentally the engaging member 52 on the float is detained by the adjacent stop 37 momentarily which causes operation of the arm 51 and counter 44 connected therewith. Upon further downward movement of the float the engaging member 52 is moved out of contact with the detaining stop because of the engagement of its lug 55 with the cam portion 58 on the guide 56, whereupon, the engaging member drops to its normal position in readiness for engagement with the next succeeding stop and causing the downstroke of the actuating arm 51 of the counter.

As the discharge of liquid from the measure continues the liquid level therein falls from one gauge member to another successively so that the quantity of liquid dispensed during the operation is ascertained by observation, and during the fall of the liquid level in the measure from each stop to the next succeeding stop, the engaging member is actuated as the float descends with the fall of the liquid level, causing the counter to be correspondingly progressed. Thus, the volume of liquid as it is delivered during each operation of the dispenser is indicated, and the aggregate quantity of liquid dispensed from the apparatus is shown by the counter.

One of the features of the invention is the provision whereby the indicator and the counter together with the actuating means for the counter are bodily removable from the measure and replaceable without necessitating readjustment thereof. This is accomplished by applying pressure to the upper end of the standard 24 against the spring 43, whereupon the standard may be lifted free from the studs 40 and 41 and removed through the top of the measure. In this manner the indicating and counting apparatus and the interior of the measure may be expeditiously subjected to such cleansing operations and repair as may be desired, after which the indicating and counting apparatus may be re-established within the measure in their original state of adjustment.

I claim:—

1. In a liquid dispenser, a transparent measure having a lid for its top and provided with a check-valve air inlet for its upper end and an overflow pipe, a supporting standard removably mounted in an exact position within the measure and provided with a series of adjustable gauge members to indicate different liquid levels in the measure, and also having a series of adjustably spaced stops corresponding with said gauge members, guides in supported connection with said standard, a float vertically movable on said guides, a counter supported by the float provided with an actuating arm, a pivoted member on said arm normally extending into the vertical plane of and engageable by said stops successively as the float descends with the fall of the liquid level in the measure, and a deflector to automatically disengage said member from each stop subsequent to its detention thereby and incidental operation of the counter.

2. In a liquid dispenser having a transparent measure provided with filling and emptying means and an overflow pipe, an indicating means mounted in an exact position within the measure bodily removable therefrom and replaceable therein, said indicating means consisting of a supporting standard provided with a series of gauge members and corresponding series of stops, guides supported in connection with the standard, a float-supported counter movable with respect to the guides and having operating mechanism engageable successively with said stops upon downward travel of the counter, and a deflector for automatically disengaging said mechanism from each stop subsequent to its detention thereby and incidental operation of the counter.

3. In a liquid dispenser having a transparent measure provided with filling and emptying means and an overflow pipe, a supporting standard disposed within the measure having a series of gauge members and corresponding series of stops, a float having guiding means therefor supported by said standard, a counter on said float provided with an operating mechanism therefor actuated successively upon detention by said stops respectively as the float descends with the fall of the liquid level in said measure, and means to automatically disengage said mechanism from said stops sequentially as detained thereby and the counter is correspondingly actuated.

4. In a liquid dispenser having a transparent measure provided with filling and emptying means and an overflow pipe, a supporting standard disposed removably and replaceably in an exact position within the measure and having a vertical series of stops and a stationary guiding means, a float having movement on said guides upon rise and fall of the liquid level in the measure, a counter on said float provided with operating mechanism therefor actuated successively upon detention by said stops respectively as the float descends with the fall of the liquid level in said measure, and means to automatically disengage said mechanism from said stops sequentially as detained thereby and the counter is correspondingly actuated.

5. In a liquid dispenser having a transparent measure provided with filling and emptying means, a vertical series of spaced stops supported within the measure, a float having guided movement adjacent said series of stops upon rise and fall of the liquid level in the measure, a counter supported on the float provided with operating mechanism therefor actuated by said stops respectively in succession as the float descends with the fall of the liquid in said measure, and means to automatically deflect said mechanism from engagement with said stops respectively after detention thereby and the counter has been correspondingly actuated.

6. A liquid dispenser having a pedestal surmounted by a transparent measure provided with filling and emptying means and an overflow pipe, a lid normally closing the top of the measure, and an indicating and counting appliance mounted in an exact position within the measure relative to said overflow pipe and being bodily removable and replaceable with respect to the measure through the top thereof when the lid is open.

7. A liquid dispenser having a pedestal and transparent measure supported thereon provided with filling and emptying means, a hinged dome on the top of the measure, a stationary conduit in connection with the pedestal, a lamp supporting fixture having conduit branches secured in said dome and provided with electrical lamps, a nipple connecting the stationary conduit and one of said branches axially alined with the hinges for the dome, and electrical conductors strung through said stationary conduit, nipple and fixture for energizing said lamps.

BYRON J. PEPPER.